Feb. 21, 1939.   H. F. PFEIFFER   2,147,668
RECORDING APPARATUS
Filed April 30, 1935
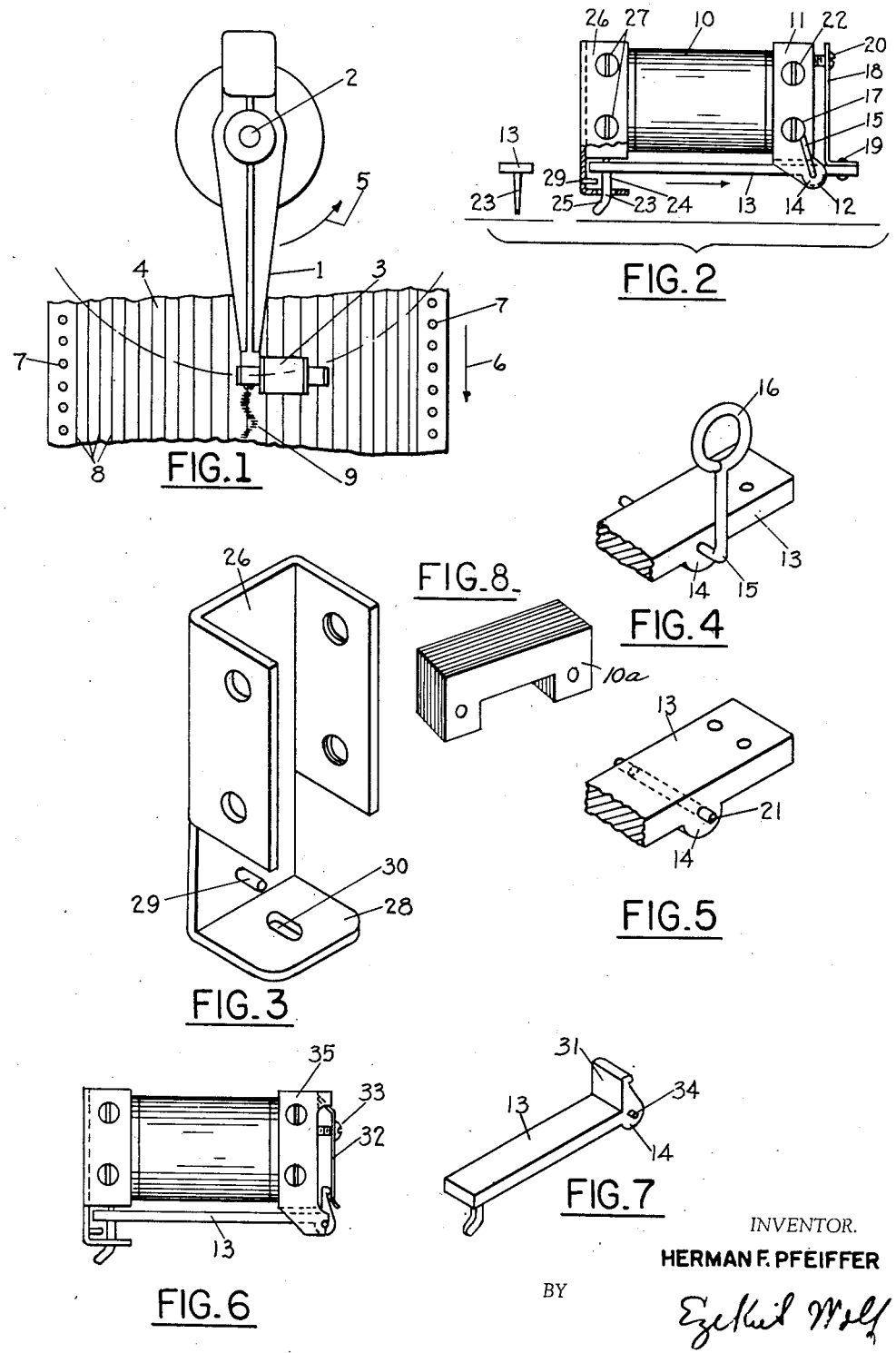
INVENTOR.
HERMAN F. PFEIFFER
BY
Ezekiel Wolf
ATTORNEY.

Patented Feb. 21, 1939

2,147,668

UNITED STATES PATENT OFFICE 2,147,668

RECORDING APPARATUS

Herman F. Pfeiffer, New York, N. Y., assignor to Submarine Signal Company, Boston, Mass., a corporation of Maine Application April 30, 1935, Serial No. 19,076

2 Claims. (Cl. 234—70)

The present invention relates to recording apparatus, particularly adapted for recording the length of short time intervals, which may be defined by successive electric impulses and may recur at frequent intervals as in echo distance measuring systems. Such a recording device is also useful in any system where time intervals of the order of 0.01 second and perhaps recurring as often as three or four per second must be recorded with an accuracy of one half of one percent.

In echo distance measuring systems, as is well known, a wave energy impulse is transmitted and the reflection from the object whose distance is being measured is received. The time interval between the instant of production of the signal and the receipt of the echo is a measure of the distance. In order to obtain a substantially continuous indication of varying distance as, for example, of the depth of water beneath a ship or the height of an aircraft above the ground, it is customary to emit the signal impulses periodically. It will be evident that in order to obtain a record of a varying distance, such as the depth of water beneath a ship, it is necessary to record a long series of rapidly recurring individual time-interval measurements. It also should be noted that the time intervals to be measured are extremely short, viz. of the order of 0.01 second, and that a measurement is usually made every two to four seconds or even more often.

A recorder for automatically making a record of such a series of measurements is described in the copending application of Edwin E. Turner, Jr., Serial No. 561,213, filed September 4, 1931, maturing into Patent No. 2,108,089, granted February 15, 1938. This recorder comprises an arm rotated at a constant speed and arranged to sweep over the record paper once in each revolution. At the end of the arm an electromagnet and armature carrying a stylus are mounted. When the stylus passes a zero line on the record paper, the signal is emitted and when the echo returns, the stylus is caused to mark the paper. The record paper is coated with wax which is removed by the stylus when a mark is being made. In the arrangement generally preferred the stylus is normally held off the paper by the energized electromagnet and is impelled against the paper by a spring when a mark is to be made. This occurs when a reflected signal impulse is received, which deenergizes the electromagnet momentarily.

In this arrangement difficulties were often encountered in that the wax removed from the record paper by the stylus tended to fill the space between the electromagnet poles and the armature, thereby preventing proper operation. Furthermore, the cleaning of the device was difficult due to the construction employed. In addition the cylindrical or conical stylus which was used would often tear the paper.

The present invention provides an improved recorder of the type described, and particularly an improved electro-magnet and stylus unit for such a recorder.

The present invention will best be understood by reference to the accompanying drawing in which Fig. 1 shows the general arrangement of the stylus carrying arm with respect to the record paper; Fig. 2 shows an improved electromagnet and stylus unit; Figs. 3 and 4 show details of the arangement shown in Fig. 2; Fig. 5 shows a modification of the detail shown in Fig. 4; Fig. 6 shows a modification of the device shown in Fig. 2; Fig. 7 is a detail of the arrangement shown in Fig. 6; and Fig. 8 shows a perspective view of the electromagnet core.

As shown in Fig. 1, an arm 1 mounted on the shaft 2 is rotated at a constant speed in the direction of the arrow 5. At the end of the arm 1 an electromagnet and marking stylus unit 3 is mounted which in each revolution of the arm sweeps across a record paper shown at 4. The paper 4 is moved in the direction of the arrow 6 by a mechanism, which is not shown, but which engages holes 7 in the edges of the paper.

The paper chart is suitably graduated in units of distance by the parallel lines 8. The first line at the left side of the chart is the zero line. At the instant the stylus passes over this line, the wave energy signal is emitted. When the echo or reflection from the object whose distance is being measured is received, the stylus is impelled against the record paper which is coated with wax. The stylus scrapes off a portion of this wax making a short transverse line. Repeated measurements produce a series of these short transverse lines whose initial ends define a curve of the varying distance which has been measured as shown at 9.

An improved magnet and stylus unit is shown in Fig. 2. An electromagnet coil 10 is wound on a U-shaped core 10a (Fig. 8) whose ends form the poles of the magnet. One end of the core is covered by a metal cover 11 U-shaped in cross section having projections 12 with holes therein forming bearings for the armature axis. Instead of being U-shaped in cross section the cover 11 may simply be composed of two plates fixed one to each side of the core.

The armature 13 consists of a strip of magnetic material of a suitable length having a thickened portion 14 shown in detail in Fig. 4. Through a hole in the portion 14 a pin 15 is fitted which acts as an axis for the armature and supports the same in the holes formed in the cover plate 11. To prevent the pin 15 from being displaced, one end of the pin is provided with a right-angled extension terminating in an eye 16 which may conveniently be fastened to the magnet core by means of the screw 17. A flat spring 18 is riveted to the armature by the rivets 19 and serves to tension the armature away from the electromagnet. The tension provided by the spring may be adjusted by means of the adjusting screw 20. It will be evident that with the construction which has just been described, the armature is readily removable from the electromagnet for it is simply necessary to remove the screw 17 and to pull out the pin 15. If the end of the spring 18 which fits over the screw 20 is made in the form of a slot, the whole armature may then easily be removed.

A modification of this construction is shown in detail in Fig. 5. According to this modification the pin shown at 21 is not provided with an extension and an eye 16, but is firmly fixed in the armature. One side of the cover plate 11 is in this case made removable by removing the screws 17 and 22 whereupon the armature can also be removed.

At the opposite end of the armature the marking stylus 23 is fixed. The stylus 23 is substantially oval in cross section. It has a straight portion 24 and a bent portion 25. An end view of the armature and stylus is shown at the left in Fig. 2. The left pole of the electromagnet is covered by a cover plate 26 shown in detail in Fig. 3. The cover plate 26 is fastened to the core by means of screws 27. The upper portion of the plate is U-shaped in cross section. The portion of the plate projecting below the electromagnet pole has the side of the plate cut away and terminates in a right-angled extension 28, as shown in Fig. 3. A pin 29 serves as a stop for the armature. The stylus 23 passes freely through a hole 30 in the extension 28. The shape of the cross section of the stylus reduces the amount of wax removed from the record paper when a mark is being made and makes a narrower sharper line as compared with a stylus of circular cross section as heretofore used. Furthermore, the bend at the lower end 25 of the stylus is such that the stylus makes an angle of approximately 55 degrees with the plane of the paper instead of 90 degrees as heretofore used. This permits it to ride over the edge of the record paper without tearing the paper in the event that the stylus should at that instant be in contact with the paper.

The extension 28 of the cover plate 26 and the oval instead of circular cross section of the stylus reduces to a minimum the amount of wax which can collect along the surface of the stylus so that none of the wax can get in between the armature and the pole face.

A modification of the armature mounting arrangement shown in Figs. 2, 4 and 5 is illustrated in Figs. 6 and 7. The armature 13 is in this case terminated at the thickened portion 14 with an upwardly extending portion 31 at right angles to the flat portion 13. The tensioning spring, as shown at 32, is free at the lower end and bears against the upwardly projecting end 31 of the armature. The opposite end of the spring 32 extends beyond the adjusting screw 33 and is bent to bear against the end of the magnet core. The thickened portion 14 of the armature is provided with a pin 34 which is similar to the pin 21 in Fig. 5. This pin similarly fits into suitable holes in the cover plate 35. This construction is somewhat easier to manufacture inasmuch as it is not necessary to rivet the spring to the armature.

Having now described my invention, I claim:

1. In a recording instrument, a recording element including a U-shaped magnet, a flat armature extending across the poles of the magnet and carrying a marking stylus, means for supporting the armature comprising a pair of ears extending downwards and outwards from opposite faces of one of the poles of said magnet, one on each side of said armature, said armature and said ears having coaxial apertures therein, a pivot pin adapted to pass through said apertures, said pivot having a right-angled extension at one end and a single screw adapted to secure said extension to said pole.

2. In a recording instrument, a recording element including a U-shaped magnet, a flat armature extending across the poles of the magnet and carrying a marking stylus, means for supporting the armature comprising a pair of ears extending downwards and outwards from opposite faces of one of the poles of said magnet, one on each side of said armature, said armature and said ears having coaxial apertures therein, a pivot pin adapted to pass through said apertures, said armature having an extension beyond said aperture, a right-angled leaf spring secured by one arm to said armature extension in a position so that the other arm extends substantially parallel to said magnet pole and having an aperture therein and a single screw adapted to pass through said aperture and into said pole for tensioning said armature.

HERMAN F. PFEIFFER.